United States Patent [19]

Miller

[11] Patent Number: 4,850,796
[45] Date of Patent: Jul. 25, 1989

[54] CENTRIFUGAL PUMP WITH SPLITTER VANE/SHUT-OFF VALVE SYSTEM

[75] Inventor: Patrick C. Miller, Phoenix, Ariz.

[73] Assignee: Sundstrand Corporation, Rockford, Ill.

[21] Appl. No.: 198,744

[22] Filed: May 25, 1988

[51] Int. Cl.[4] ............................................. F01D 15/10
[52] U.S. Cl. ................................... 415/150; 415/151; 137/512.1
[58] Field of Search ............... 415/148, 150, 151, 159, 415/127, 183; 417/360, 361; 137/512.1, 565; 251/118, 127

[56] References Cited

U.S. PATENT DOCUMENTS

| | | | |
|---|---|---|---|
| 2,083,447 | 6/1937 | Hoffmann | 415/151 X |
| 2,831,499 | 4/1958 | Myron | 137/512.1 |
| 3,263,906 | 8/1966 | Ward | 137/512.1 X |
| 3,635,580 | 1/1972 | Richardson et al. | 415/150 |
| 3,807,444 | 4/1974 | Fortune | 137/512.1 |
| 4,637,779 | 1/1987 | Sherman et al. | 415/143 |
| 4,781,527 | 11/1988 | Miller | 415/151 X |

FOREIGN PATENT DOCUMENTS

| | | | |
|---|---|---|---|
| 1060818 | 12/1983 | U.S.S.R. | 415/151 |
| 1130697 | 12/1984 | U.S.S.R. | 415/150 |

Primary Examiner—Robert E. Garrett
Assistant Examiner—Joseph M. Pitko
Attorney, Agent, or Firm—Wood, Dalton, Phillips Mason & Rowe

[57] ABSTRACT

A splitter vane/shut-off valve system for use in a centrifugal pump which includes an impeller and an inlet to the impeller. A plurality of planar, anti-swirl vanes are arranged in a cross-configuration across the inlet adjacent the impeller to straighten the flow of fluid to the impeller and to prevent swirling of the fluid by the impeller. Edges of the planar vanes, facing the incoming fluid, define a valve seat. A plurality of petal valves are pivotally mounted at pivot points to the side of the inlet and movable toward and away from the center of the inlet. The petal valves engage the valve seat defined by the edges of the planar vanes for closing the inlet to allow removal of the impeller.

20 Claims, 1 Drawing Sheet

CENTRIFUGAL PUMP WITH SPLITTER VANE/SHUT-OFF VALVE SYSTEM

FIELD OF THE INVENTION

This invention generally relates to pumps such as centrifugal pumps and, particularly, to an anti-swirl vane/valve system for such a pump.

BACKGROUND OF THE INVENTION

Most every centrifugal pump has a peak efficiency point which can be plotted on a performance curve of flow rate versus efficiency. When the centrifugal pump operates at a condition off of the peak efficiency point, it creates pre-rotation and back-flow conditions. A pre-rotation or pre-swirl condition is the mismatch between incoming fluid flow and the rotation of the impeller inlet blades. Back-flow is a phenomena which occurs when flow reverses around the inducer's leading edge in a swirling motion back down the inlet piping. These characteristics of the pump inlet flow reduce the overall pump performance, due to excess work done on the fluid by the impeller blades, and the increased air in the inlet line, in essence, reduces the inlet area for the pump liquid, such as a fuel.

If the swirling problem can be reduced or stopped by some means, the pump capabilities will increase. One solution is to provide a deswirl vane or splitter vane means in the pump inlet. This drastically increases the performance of the pump by reducing the swirling in the inlet.

It is desirable with most such centrifugal pumps of the character described to construct the pump so that the impeller means, blades, etc. are readily removable for maintenance, repair or replacement. Therefore, it is desirable to provide a shut-off valve means to close the inlet when the impeller means are removed.

Providing these desirable features of anti-swirl vane means and shut-off valve means in centrifugal pump systems creates problems due to envelope and maintenance constraints placed on pump designs, such as the overall length of the pump, i.e., the pump envelope. This is particularly critical in the aircraft or aerospace field. Splitter vanes take up considerable space within the envelope. In addition, the most efficient shut-off inlet valve design is a bi-petal design which has petal valves that swing about a radius which is within the envelope. Obviously, providing all these features in a single pump design can substantially increase the envelope size.

This invention is directed to solving this dilemma by providing a new and improved anti-swirl vane and shut-off valve system of an extremely compact design while still performing the desirable functions.

SUMMARY OF THE INVENTION

An object, therefore, of the invention is to provide a new and improved centrifugal pump design, wherein the pump includes impeller means and inlet means to the impeller means, along with a very compact and efficient splitter vane/shut-off valve system.

In the exemplary embodiment of the invention, generally, anti-swirl vane means are provided in the inlet means of the pump, adjacent the impeller means, to straighten the flow of fluid to the impeller means and to prevent swirling of the fluid by the impeller means. The vane means include integral valve seat means in the inlet means. In other words, the anti-swirl vane means itself defines the valve seat means. Valve means are provided in the inlet means engageable with the valve seat means on the vane means for closing the inlet means to allow removal of the impeller means.

Specifically, the vane means comprise at least one vane of a generally planar configuration in the direction of incoming fluid flow through the inlet means. An edge of the planar vane forms at least a portion of the valve seat means. Still more particularly, the vane means is formed by a plurality of planar vanes in a cross configuration across the inlet means, the edges of the cross configuration defining the valve seat means. The vane means is a unitary structure with the cross vanes being formed by integral, intersecting portions of the unitary structure.

The valve means is provided by a plurality of petal valves pivotally mounted at pivot points to the side of the inlet means and movable toward and away from the center of the inlet means. More particularly, a pair of generally semi-circular petal valves are pivotally mounted, with swinging diametral closing edges. One of the cross edges of the planar vanes defines a linear edge portion engageable by the diametral edges of the petal valves when in shut-off condition.

Another feature of the invention is to provide the planar vanes in a configuration across the inlet means complementary to the configuration of the adjacent impeller blade edges. For instance, the impeller blade edges are angled to define a cone-shaped path of movement, with the apex pointing upstream of the inlet means. The cross vanes are configured to have front and back side edges complementarily shaped to the angled edges of the impeller blade. This also cuts down on the pivotal arc for opening and closing the petal valves.

Lastly, the petal valves include cam actuating means engageable with complementary cam actuating means on the impeller means for automatically opening and closing the petal valves in response to proper positioning and removal, respectively, of the impeller means.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
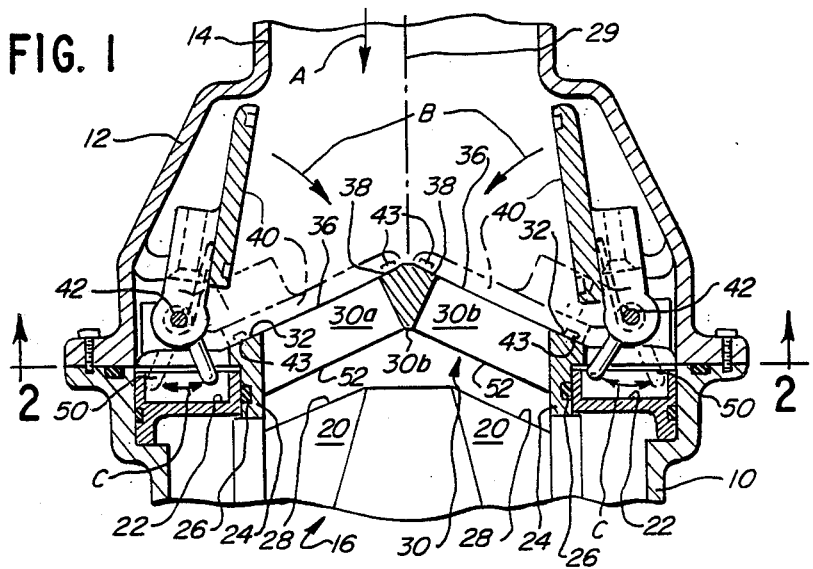
FIG. 1 is a sectional view through a housing of a centrifugal pump, illustrating the splitter vane, shut-off valve system of the invention.

Referring to the drawings in greater detail, and first to FIG. 1, a centrifugal pump is illustrated to include a lower pump and motor housing 10 appropriately joined to an upper bell-shaped inlet housing 12 communicating with an inlet conduit 14 for incoming fluid which is to be pumped in the direction of arrow "A". The pump is a centrifugal-type pump which includes impeller means, generally designated 16, having an impeller hub 18 and radially projecting impeller blades 20. The remainder of the centrifugal pump/motor apparatus is not shown in the drawings but is of conventional configuration. Suffice it to say, lower pump housing 10 has a cam track means 22 in the upper edge thereof for purposes to be described in greater detail hereinafter. The pump assembly or apparatus is sealed to an inner cylindrical portion 24 of inlet housing 12 by appropriate seals 26.

It also can be seen that the upper edges 28 of impeller blades 20 are angled away from an axis 29 of rotation of the pump, in a diverging manner away from inlet means 12,14. Therefore, in essence, the blade edges rotate in a generally conical path, with the cone configuration diverging outwardly away from axis 29.

The invention contemplates anti-swirl vane means, generally designated 30, in the inlet means adjacent the impeller means to straighten the flow of fluid to the impeller means and to prevent swirling of the fluid by the impeller means. More particularly, vane means 30 include a plurality of planar vanes 30a and 30b, the planes of the vanes being generally parallel to or in the direction of incoming fluid flow through the inlet means, as indicated by arrow "A".

Figure 2:
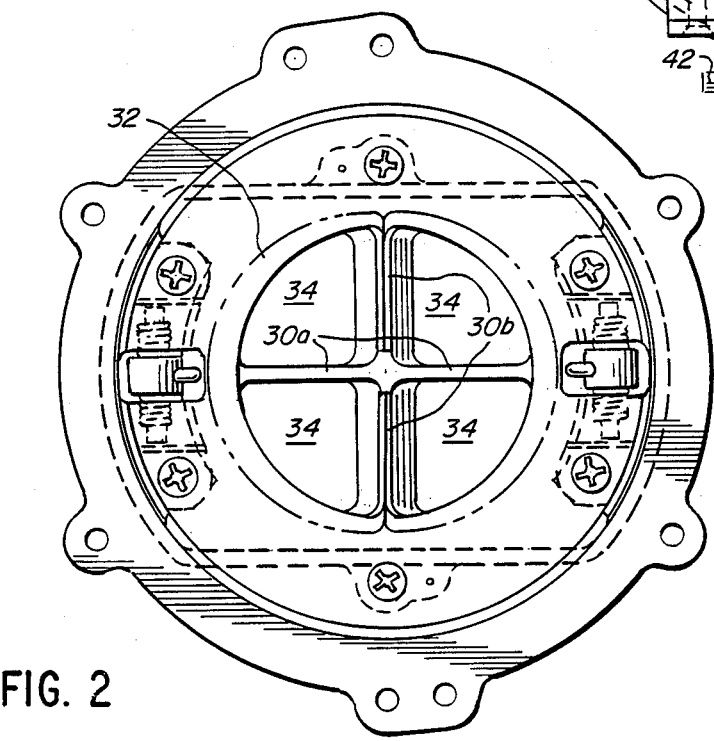
FIG. 2 is a bottom plan view, looking upwardly in the direction of arrows 2—2 of FIG. 1, with the impeller means/motor of the pump removed.

Referring to FIG. 2 in conjunction with FIG. 1, it can be seen that planar vanes 30a,30b are in a cross configuration across the inlet means. In essence, vanes 30a form one diametral leg of the cross configuration and vanes 30b combine to form the other leg of the cross. The opening through or past vanes 30a,30b is generally circular, as defined by a circular, planar land 32 surrounding four passageways 34 (FIG. 2) through the center of the circular land and between cross vanes 30a, 30b. Referring to FIG. 1, the tops of vanes 30a are flattened, as at 36, and the tops of vanes 30b are flattened, as at 38. Therefore, circular land 32 and the flattened edges 36 of vanes 30a and flattened edges 38 of vanes 30b all combine to provide integral valve seat means on the incoming side of the vane means.

Figure 3:
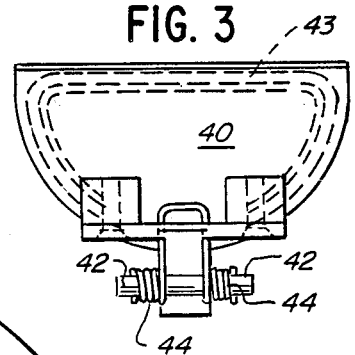
FIG. 3 is an isolated top plan view of one of the petal valves of the system.

Generally, valve means are provided in the inlet means engageable with the valve seat means 32,36,38 for closing the inlet means to allow removal of the impeller means 16 and its associated housing, motor, etc. More particularly, referring to FIG. 3 in conjunction with FIG. 1, a pair of semi-circular petal valves 40 are pivotally mounted on respective pivot pins 42 within and to the side of inlet housing 12. The petal valves are spring loaded by coil springs 44 (FIG. 3) for normally biasing the valves to closed condition in the direction of arrows "B" (FIG. 1) against valve seat means 32,36,38. Somewhat half-moon-shaped seals 43 are embedded in the underside of petal valves 40 for engaging the valve seat means.

FIG. 1 shows petal valve 40 in full lines in open condition and in phantom lines in closed condition. It is contemplated that these positions be maintained automatically in response to mounting impeller means 16 and housing means 10 to inlet housing 12, as shown. More particularly, as stated initially, cam slots 22 are provided in the upper edge of impeller housing 10. These cam slots are arcuately shaped but eccentric to axis 30 of the pump. Each petal valve has a short stub-like cam follower 50 which is positionable within the respective cam slot 52 upon axial insertion of impeller housing 10 and impeller means 16 upwardly against inlet housing 12. Upon relative rotation of impeller housing 10 and inlet housing 12, cam followers 50 will ride in the angled cam slots 22 to bias the petal valves 40 upwardly from the closed positions shown in phantom to the positions shown in full lines in FIG. 1. Although not shown in the drawings, the interconnection or coupling between impeller housing 10 and inlet housing 12 can be of various constructions, such as a threaded connection, a bayonet and pin connection, or the like, whereby the impeller housing will seat into proper sealing position with inlet housing 12 upon relative rotation therebetween. When it is desirable or necessary to remove the pump impeller means, impeller housing, motor, etc., housing 10 simply is rotated in a reverse direction, causing cam followers 50 to move in cam slots 22 and allow springs 44 to bias petal valves to their closed position. In essence, cam slots 22 are configured to effect generally radial movement of cam follower 50 in the direction of double-headed arrows "C".

Lastly, as stated above, upper edges 28 of impeller blades 20 are angled or diverge away from axis 29 in the direction of incoming fluid flow. Likewise, the adjacent edges 52 of vanes 30a as well as vanes 30b also are angled to reduce the amount of actuation that cam slot 22 must perform in order to open petal valves 40. In addition, this cuts to a minimum the distance between all points along edges 28 of impeller blades 20 and the anti-swirl vanes to ensure that the incoming fluid is "straightened" by the vanes.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a centrifugal pump which includes impeller means, and inlet means to the impeller means, a splitter vane/shut-off valve system comprising:

anti-swirl vane means in the inlet means adjacent the impeller means to straighten the flow of fluid to the impeller means and to prevent swirling of the fluid by the impeller means, the vane means terminating in edge means defining valve seat means in the inlet means; and valve means in the inlet means engageable with the valve seat means on the vane means for closing the inlet means to allow removal of the impeller means.

2. In a centrifugal pump as set forth in claim 1, wherein said valve means comprise a plurality of petal valves pivotally mounted at pivot points to the side of the inlet means and movable toward and away from the center of the inlet means.

3. In a centrifugal pump as set forth in claim 2, including a pair of said petal valves of generally semi-circular configuration with diametral closing edges.

4. In a centrifugal pump as set forth in claim 3, wherein said valve seat means include a linear edge portion engageable by the diametral edges of the petal valves.

5. In a centrifugal pump as set forth in claim 2, wherein said petal valves include cam actuating means engageable with complementary cam actuating means on a housing portion of the impeller means for automatically opening and closing the petal valves in response to proper positioning and removal, respectively, of the impeller means.

6. In a centrifugal pump which includes impeller means, and inlet means to the impeller means, a splitter vane/shut-off valve system comprising:

at least one anti-swirl vane in the inlet means adjacent the impeller means, the vane being of a generally planar configuration in the direction of incoming fluid flow through the inlet means to straighten the flow of fluid to the impeller means and to prevent swirling of the fluid by the impeller means, an edge of the planar vane forming integral valve seat means in the inlet means; and a plurality of petal valves in the inlet means pivotally mounted at pivot points to the side of the inlet means and movable toward and away from the center of the inlet means, the petal valves being engageable with the valve seat means defined by the edge of the planar vane for closing the inlet means to allow removal of the impeller means.

7. In a centrifugal pump as set forth in claim 6, wherein said vane means comprise a plurality of planar vanes in a cross configuration across the inlet means, the edges of the vanes defining at least a portion of the valve seat means.

8. In a centrifugal pump as set forth in claim 7, wherein said vane means comprise a unitary structure with said plurality of vanes formed by integral, intersecting portions of the unitary structure.

9. In a centrifugal pump as set forth in claim 6, including a pair of said petal valves of generally semicircular configuration with diametral closing edges.

10. In a centrifugal pump as set forth in claim 9, wherein said valve seat means include a linear edge portion engageable by the diametral edges of the petal valves.

11. In a centrifugal pump as set forth in claim 6, wherein said petal valves include cam actuating means engageable with complementary cam actuating means on a housing portion of the impeller means for automatically opening and closing the petal valves in response to proper positioning and removal, respectively, of the impeller means.

12. In a centrifugal pump as set forth in claim 6, wherein said impeller means include impeller blades having edges facing the inlet means, the edges being angled in a diverging manner away from the center of the inlet means, and a back edge of a planar vane opposite said valve seat defining edge being angled complementary to the impeller blade edge.

13. In a centrifugal pump which includes impeller means, and inlet means to the impeller means, a splitter vane/shut-off valve system comprising:

a plurality of planar anti-swirl vanes in a cross configuration across the inlet means adjacent the impeller means to straighten the flow of fluid to the impeller means and to prevent swirling of the fluid by the impeller means, edges of the planar vanes forming integral valve seat means in the inlet means; and a pair of petal valves of generally semi-circular configuration with diametral closing edges in the inlet means pivotally mounted at pivot points to the side of the inlet means and movable toward and away from the center of the inlet means, the petal valves being engageable with the valve seat means defined by the edges of the planar vanes for closing the inlet means to allow removal of the impeller means.

14. In a centrifugal pump as set forth in claim 13, wherein said vane means comprise a unitary structure with said plurality of vanes being formed by integral, intersecting portions of the unitary structure.

15. In a centrifugal pump as set forth in claim 13, wherein said valve seat means include a linear edge portion engageable by the diametral edges of the petal valves.

16. In a centrifugal pump as set forth in claim 13, wherein said petal valves include cam actuating means engageable with complementary cam actuating means on a housing portion of the impeller means for automatically opening and closing the petal valves in response to proper positioning and removal, respectively, of the impeller means.

17. In a centrifugal pump as set forth in claim 13, wherein said impeller means include impeller blades having edges facing the inlet means, the edges being angled in a diverging manner away from the center of the inlet means, and a back edge of a planar vane opposite said valve seat defining edge being angled complementary to the impeller blade edge.

18. In a centrifugal pump which includes impeller means, and inlet means to the impeller means, a splitter vane/shut-off valve system comprising:

anti-swirl vane means in the inlet means adjacent the impeller means to straighten the flow of fluid to the impeller means and to prevent swirling of the fluid by the impeller means, the vane means including integral valve seat means in the inlet means said vane means including at least one vane of a generally planar configuration in the direction of incoming fluid flow through the inlet means, an edge of the planar vane forming at least a portion of the valve seat means; and valve means in the inlet means engageable with the valve seat means on the vane means for closing the inlet means to allow removal of the impeller means.

19. In a centrifugal pump as set forth in claim 18, wherein said vane means comprise a plurality of planar vanes in a cross configuration across the inlet means, the edges of the vanes defining at least a portion of the valve seat means.

20. In a centrifugal pump as set forth in claim 19, wherein said vane means comprise a unitary structure with said plurality of vanes being formed by integral, intersecting portions of the unitary structure.

* * * * *